US009562615B2

(12) United States Patent  
McAlister

(10) Patent No.: US 9,562,615 B2  
(45) Date of Patent: Feb. 7, 2017

(54) ACOUSTICALLY ACTUATED FLOW VALVE ASSEMBLY INCLUDING A PLURALITY OF REED VALVES

(71) Applicant: MCALISTER TECHNOLOGIES, LLC, Phoenix, AZ (US)

(72) Inventor: Roy Edward McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

(21) Appl. No.: 14/659,396

(22) Filed: Mar. 16, 2015

(65) Prior Publication Data

US 2015/0192211 A1     Jul. 9, 2015

Related U.S. Application Data

(63) Continuation-in-part of application No. 14/586,632, filed on Dec. 30, 2014, now abandoned, which is a continuation of application No. 13/584,562, filed on Aug. 13, 2012, now Pat. No. 8,919,377.

(60) Provisional application No. 61/523,181, filed on Aug. 12, 2011.

(51) Int. Cl.
    *F16K 15/18*    (2006.01)  
    *F16K 31/00*    (2006.01)

(52) U.S. Cl.
    CPC .......... *F16K 15/186* (2013.01); *F16K 31/002* (2013.01); *F16K 31/004* (2013.01); *Y10T 137/0318* (2015.04); *Y10T 137/87161* (2015.04)

(58) Field of Classification Search
None
See application file for complete search history.

(56) References Cited

U.S. PATENT DOCUMENTS

| | | | | |
|---|---|---|---|---|
| 5,557,256 A * | 9/1996 | Achterholt | .......... | B60C 23/0425 116/34 R |
| 6,786,468 B2 * | 9/2004 | Schroeder | ........... | F16K 31/0672 251/129.17 |
| 6,893,505 B2 * | 5/2005 | Peace | ................ | H01L 21/67253 118/506 |
| 8,444,396 B2 * | 5/2013 | Higashino | ............. | F04B 43/043 417/244 |
| 8,636,032 B2 * | 1/2014 | Burns | ....................... | F15C 1/04 137/828 |
| 8,826,933 B2 * | 9/2014 | Roper | ................ | G05D 16/0669 137/315.05 |

* cited by examiner

*Primary Examiner* — John Fox  
(74) *Attorney, Agent, or Firm* — Perkins Coie LLP

(57) ABSTRACT

The present disclosure is directed to an acoustically actuated flow valve having temperature-sensitive reed valves thereon. The flow valve and reed valves are configured to impart acoustical energy into a fluid flowing through the flow valve and one or more fluids downstream of the valve, leading to increased mixing of the fluids. The reed valves are further configured to be temperature-sensitive, thereby allowing more fluid to flow through the flow valve as the result of a change in temperature.

23 Claims, 6 Drawing Sheets

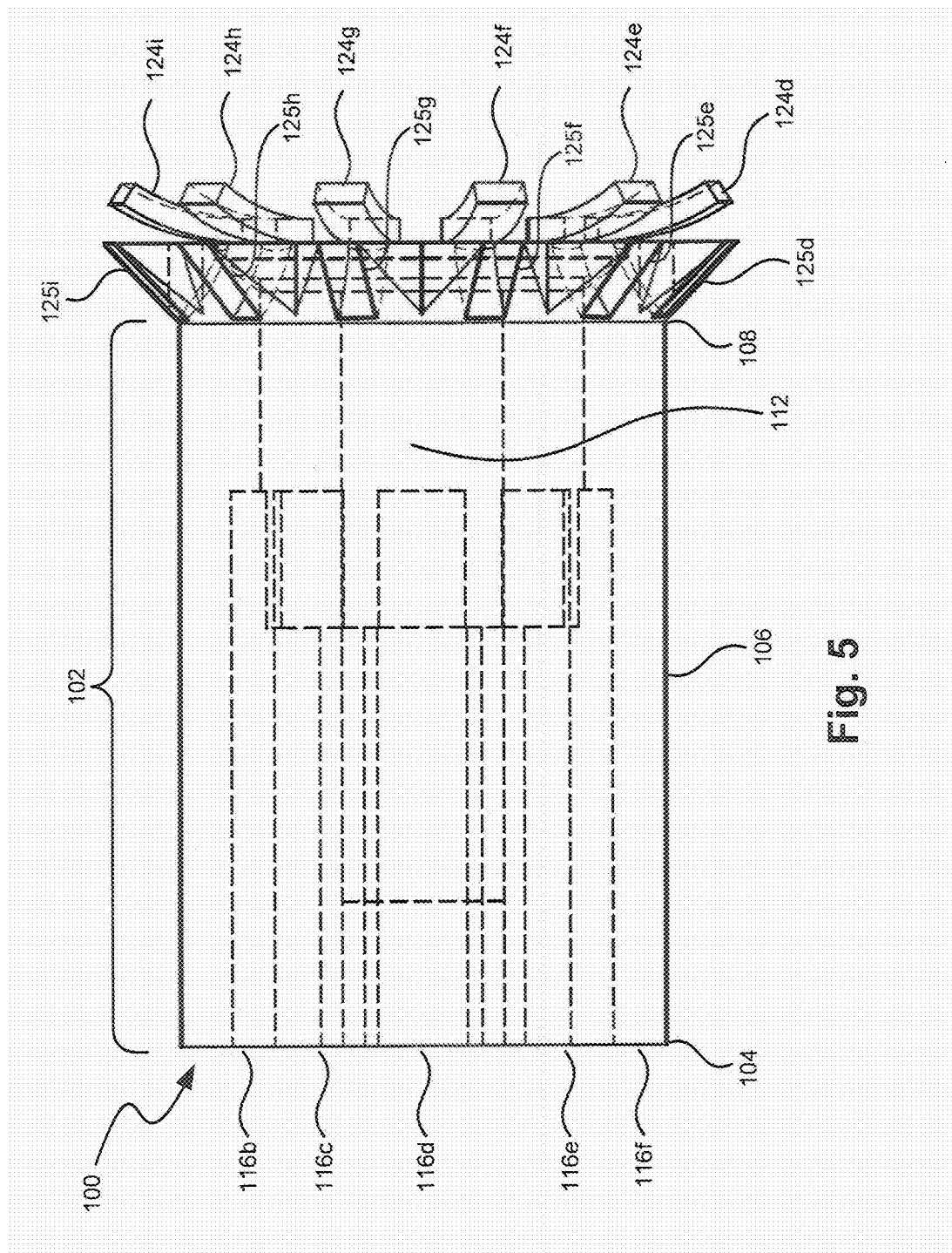

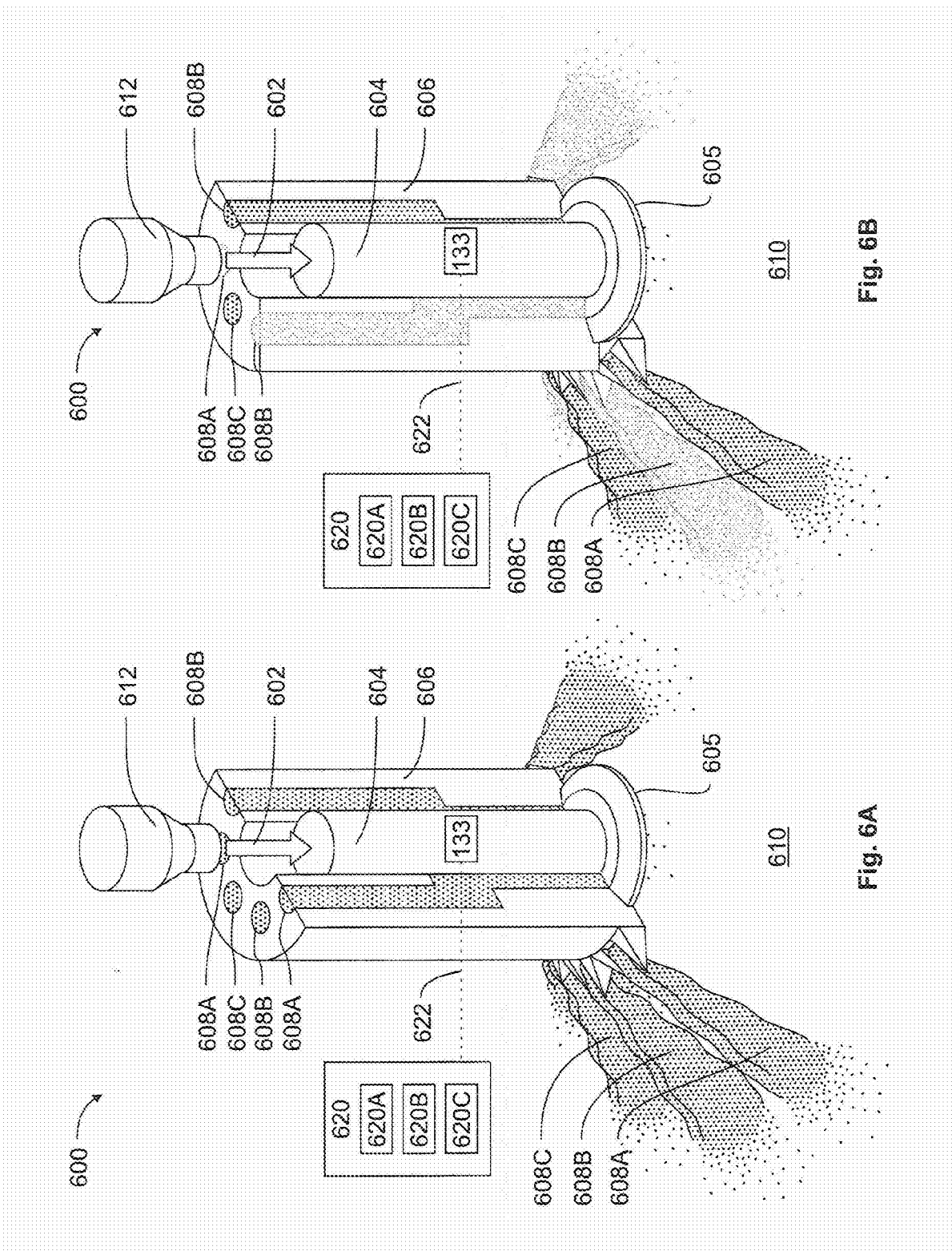

ACOUSTICALLY ACTUATED FLOW VALVE ASSEMBLY INCLUDING A PLURALITY OF REED VALVES

CROSS-REFERENCE TO RELATED APPLICATION(S)

The present application is a continuation-in-part of U.S. application Ser. No. 14/586,632, filed Dec. 30, 2014, which is a continuation of U.S. application Ser. No. 13/584,562, now U.S. Pat. No. 8,919,377, filed Aug. 13, 2012, which claims priority to and the benefit of U.S. Provisional Patent Application No. 61/523,181, filed Aug. 12, 2011, all of which are entirely incorporated by reference herein.

TECHNICAL FIELD

The present disclosure relates generally to flow valves for regulating the flow of a fluid, more specifically, to flow valves actuated to impart a fluid with acoustical energy.

BRIEF DESCRIPTION OF THE DRAWINGS

FIG. 5 is a partial cross-sectional side partial view of a flow valve assembly configured in accordance with another embodiment of the disclosure.

FIGS. 6A and 6B show partial cross-cross sectional views of fluid flows in accordance with embodiments of the disclosure.

DETAILED DESCRIPTION

The present disclosure describes devices, systems, and methods for providing a flow control valve configured to impart or modify acoustical forces to induce vibration in various types of fluids. The disclosure further describes associated systems, assemblies, components, and methods regarding the same. For example, one embodiment described below is directed generally to a flow control valve in a fuel injector that can optimize the ignition and combustion of various fuels based on combustion chamber conditions, engine load requirements, etc. Certain details are set forth in the following description and in FIGS. 1-5 to provide a thorough understanding of various embodiments of the disclosure. However, other details describing well-known structures and systems often associated with internal combustion engines, valves, injectors, igniters, and/or other aspects of combustion systems are not set forth below to avoid unnecessarily obscuring the description of various embodiments of the disclosure. Thus, it will be appreciated that several of the details set forth below are provided to describe the following embodiments in a manner sufficient to enable a person skilled in the relevant art to make and use the disclosed embodiments. Several of the details and advantages described below, however, may not be necessary to practice certain embodiments of the disclosure.

Many of the details, dimensions, angles, shapes, and other features shown in the Figures are merely illustrative of particular embodiments of the disclosure. Accordingly, other embodiments can have other details, dimensions, angles, and features without departing from the spirit or scope of the present disclosure. In addition, those of ordinary skill in the art will appreciate that further embodiments of the disclosure can be practiced without several of the details described below.

Reference throughout this specification to "one embodiment" or "an embodiment" means that a particular feature, structure, or characteristic described in connection with the embodiment is included in at least one embodiment of the present disclosure. Thus, the occurrences of the phrases "in one embodiment" or "in an embodiment" in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the claimed disclosure.

Figure 1:
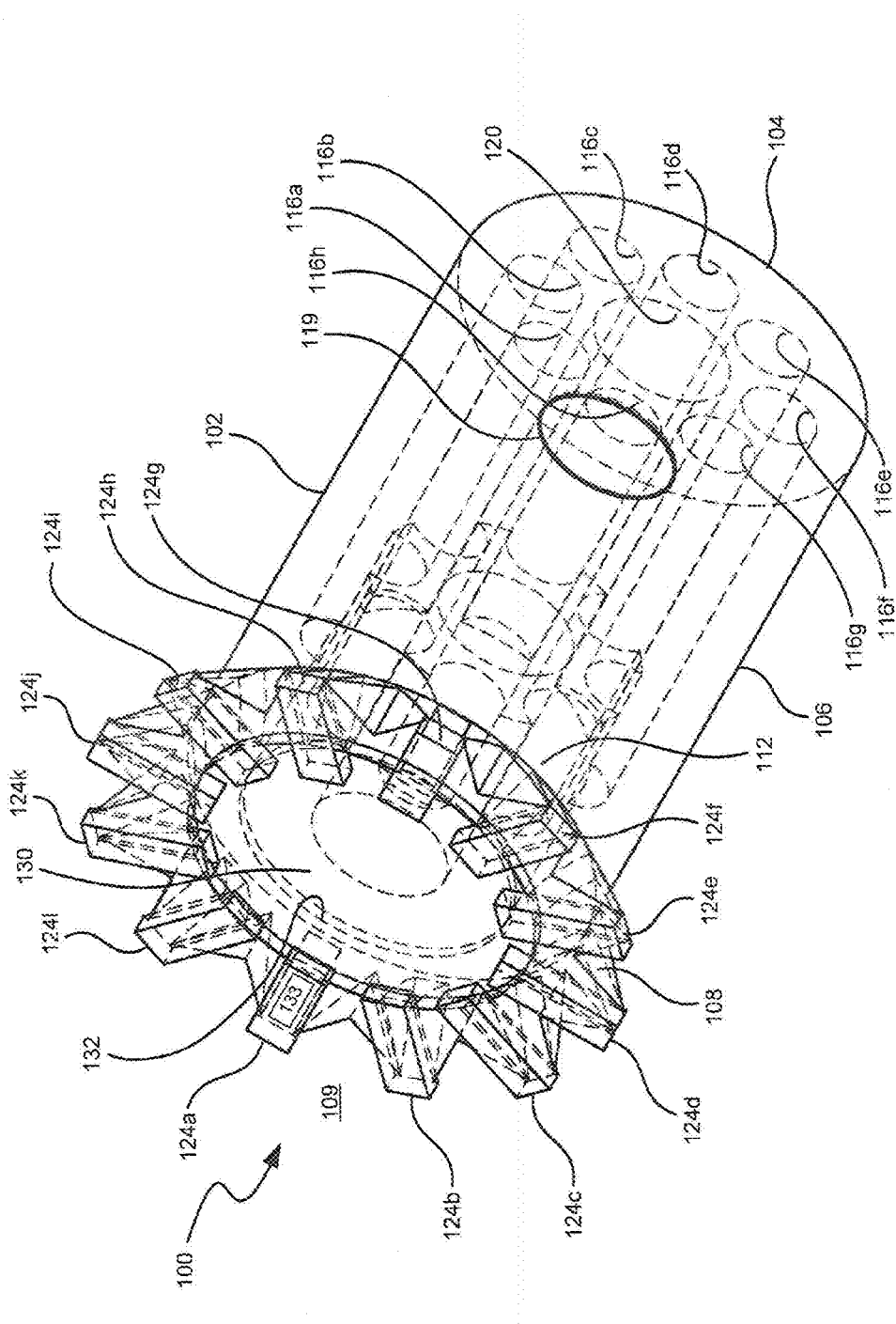
FIG. 1 is an isometric cross-sectional side view of a flow valve assembly configured in accordance with an embodiment of the disclosure.

FIG. 1 depicts an isometric cross-sectional view of a flow valve assembly 100 configured in accordance with an embodiment of the disclosure. The flow valve assembly 100 includes a body 102 having a middle portion 106 extending between a base portion 104 and a face portion 108. A plurality of tubes 116a-h extend through the body 102 from the base portion 104 through the middle portion 106 and empty into a chamber 112 adjacent to the face portion 108. A valve 132 disposed in the face portion 108 is coupled to a valve actuator 120 disposed in a bore 119 that extends the length of the body 102. The valve actuator 120 can be connected to an external actuator (not shown) that may be located adjacent to the base portion 104. In other embodiments, the valve actuator 120 can be connected to any other mechanical movement means. The external actuator can displace the valve actuator 120 in the bore 119 such that the valve actuator 120 and the valve 132 oscillate axially between at least a first position and a second position. In the first position, the valve 132 is closed and the fluid flowing through the tubes 116a-h cannot flow out of the flow valve assembly 100 into the fluid space 109. In the second (or open) position, the valve 132 is displaced outward from the face portion 108 such that a gap is formed between the valve 132 and the face portion 108. The gap can allow a fluid flowing through the tubes 116a-h into the chamber 112, to flow out of the flow valve assembly 100 into a fluid space 109 adjacent and external to the valve face 130.

The oscillation of valve 132 can impart acoustical energy into a plurality of fluids in the fluid space 109. During operation, as the fluid flowing through the flow valve assembly 100 is allowed to flow into the fluid space 109 it has an innate acoustical frequency of movement. As discussed in further detail below, the acoustical frequency may be a sub-audible, audible, or ultrasonic frequency. The innate frequency of the fluid is dependent on numerous factors including, for example, the geometry of the fluid space 109 and the flow valve 132, the mechanism of displacing the flow valve 132, and the type, temperature, velocity, pressure, density, and viscosity of the fluid. The innate frequency can be altered via a cyclic impartation of energy to the fluids, as well as to one or more components in flow valve assembly 100. Imparting this acoustical energy alters the fluid pattern, shape, phase, and/or frequency to provide for improved mixture of fluids in the fluid space 109.

The flow control valve 100 also includes reed valves 124a-l, which can be circumferentially disposed on the valve face 130, can be carried by the body 102 or can be separated from the valve face 130 or the body 102 by a spacer, diaphragm or physical space (not shown). The reed valves 124a-l can be configured to vibrate in response to a displacement of the valve 132 and valve actuator 120. The resulting oscillation of valve 132 and valve actuator 120 can result in the imparting of corresponding oscillations in the reed valves 124a-l. The oscillations of the reed valves 124a-l can impart acoustical energy or modify existing acoustical energy into a plurality of fluids flowing there around. The plurality of fluids may comprise a first fluid that can flow through the tubes 116a-h of the flow valve assembly 100 into fluid space 109, and a second fluid in fluid space 109 that may be mixed with the first fluid. The acoustical or kinetic energy imparted or modified into the fluids in the fluid space 109 further alters the fluid pattern, shape, phase, and/or frequency to provide for improved mixture of fluids in the fluid space 109.

In the illustrated embodiment, the flow valve assembly 100 has a cylindrical shape and the reed valves are more or less perpendicular to the axial travel of valve 132. In other embodiments, however, the flow valve assembly 100 may be any suitable shape and reed valves 124 may be provided in various other geometric shapes, orientations, and relationships to optimize the fuel injection pattern, ignition, combustion, and oxidant utilization events including production of corona or Lorentz accelerated ion ignition. In some embodiments valve 132 controls fluid flow to ports controlled by reed valves 124 that accordingly, depending upon each spring's stiffness, may serve as the sole or principal way for fluid to flow into a certain region of space 109. Each individual valve 124 may have a specific spring constant or stiffness that determines the pressure at which it is accelerated outward or combinations of valves with the same spring constant may be used to produce certain injection patterns at one power level and another pattern at another power level in order to optimize oxidant utilization efficiency to maximize power production and/or fuel economy.

Illustratively in another embodiment, valve 132 may allow a fluid such as fuel to flow through one or more annular distributor passages to ports that are normally closed by reed valves 124a-l. Upon vibrating or multiple burst openings of valve 132, fluid pressure, such as pressure pulses, open one or more reed valves 124 depending upon their modulus of elasticity, section modulus and resulting "stiffness" to produce a pattern of fluid distribution in zone 109. Variation of the fluid pressure and/or cyclic frequency of fluid bursts from valve 132 provides for variation of the fluid distribution pattern projected into space 109 by reed valves 124.

Figure 2:
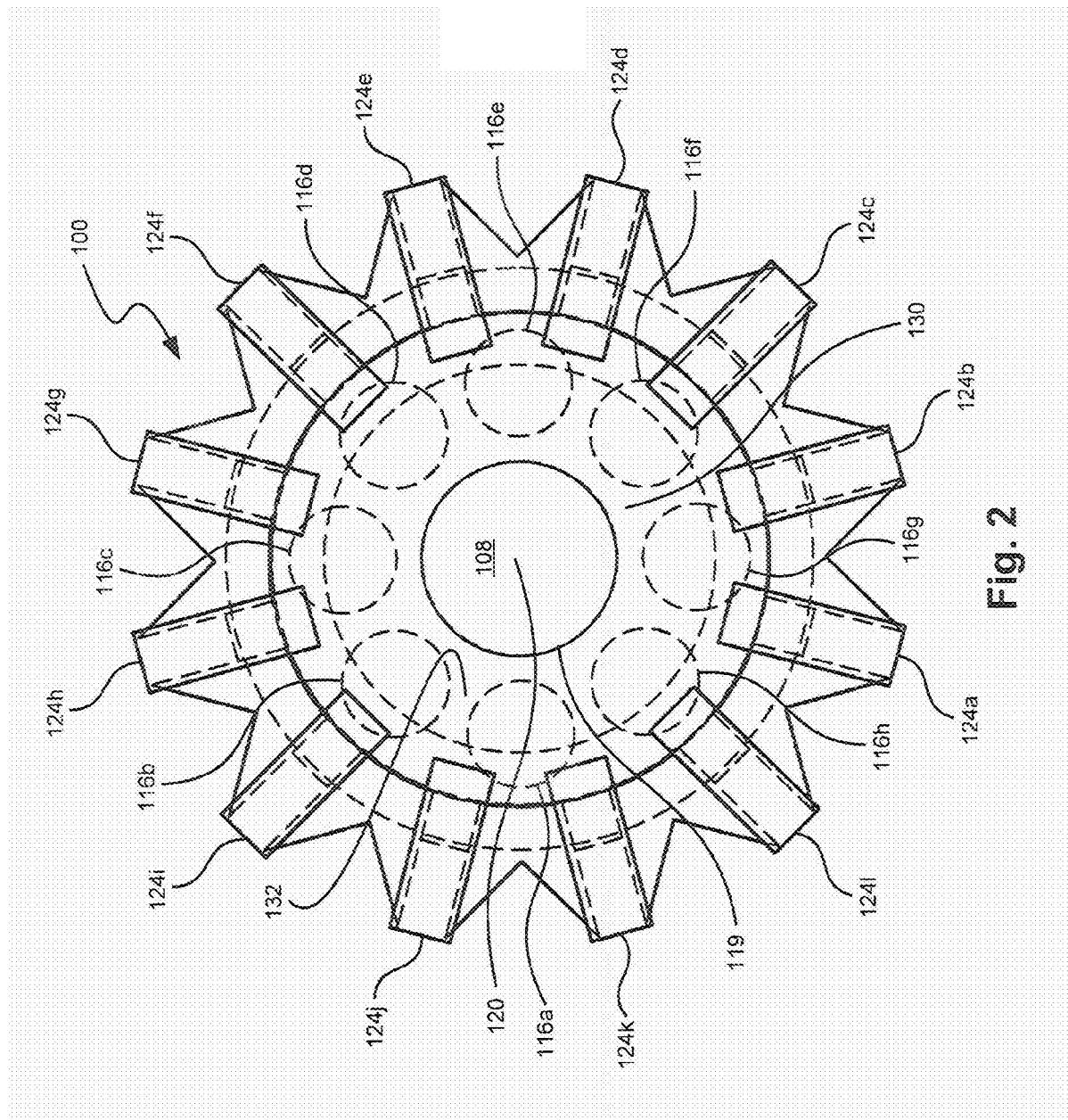
FIG. 2 is an end cross-sectional view of a flow valve assembly configured in accordance with an embodiment of the disclosure.

FIG. 2 depicts a cross-sectional end view of the face portion 108 of the flow valve assembly 100. The reed valves 124a-l are arranged around the circumference of the exterior surface of the face portion 108 upstream of the flow of the first fluid flowing through the flow valve assembly 100. The tubes 116a-h are arranged circumferentially throughout the body 102 around a bore 119. In the illustrated embodiment, the flow valve assembly 100 has a cylindrical shape. In other embodiments, however, the flow valve assembly 100 may be any suitable shape, such as a rectangle, cube, or sphere.

Figure 3:
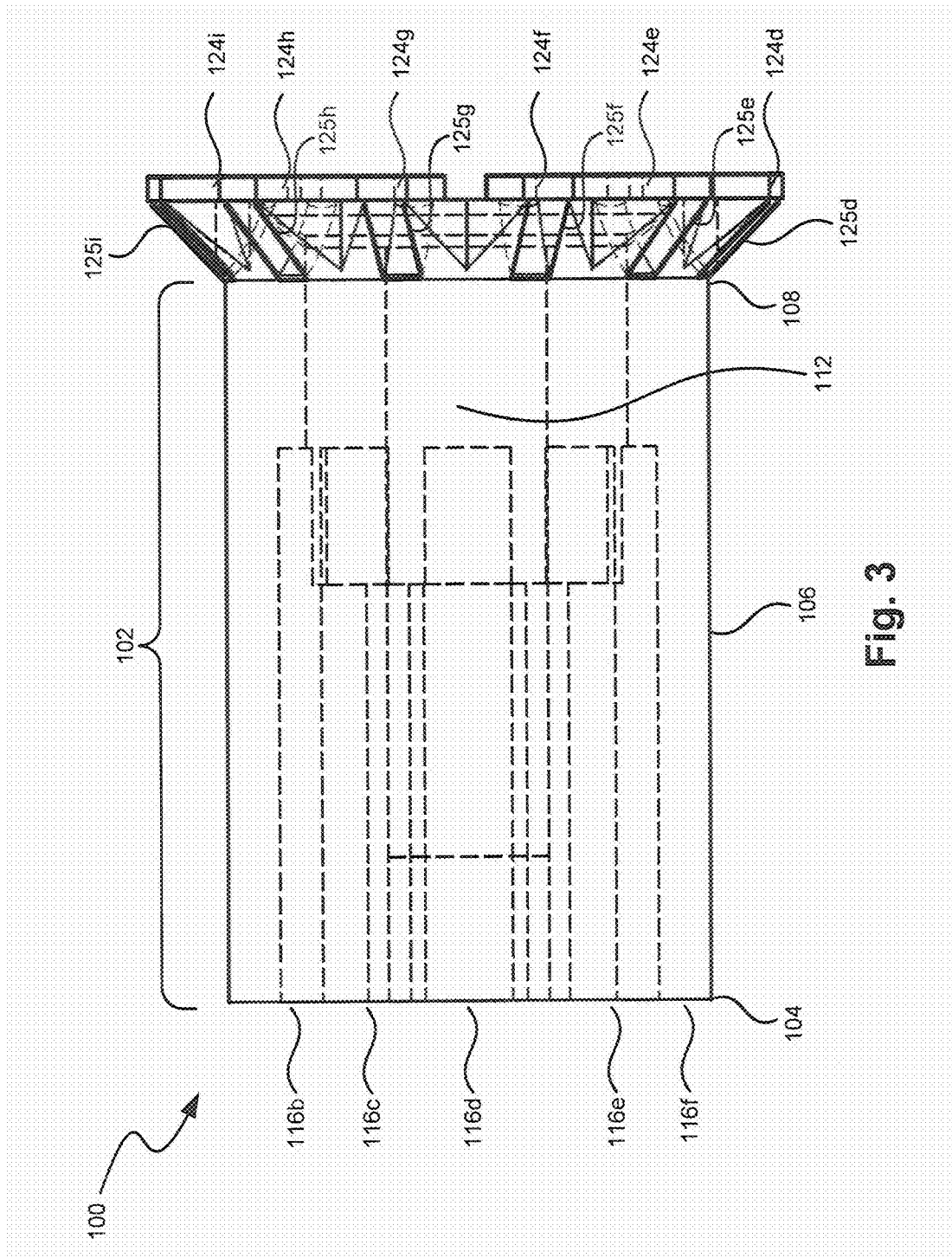
FIG. 3 is a partial cross-sectional side view of a flow valve assembly configured in accordance with an embodiment of the disclosure.

FIG. 3 depicts a partial cross-sectional side view of the flow valve assembly 100. Tubes 116b-f and reed valves 124d-i are visible in this view. A series of grooves 125d-i are formed circumferentially around the face portion 108 and are configured such that each of the reed valves 124a-l covers a corresponding groove 125d-i. The grooves 125d-i can act as channels for a fluid entering the fluid space 109 when valve 132 is open. A fluid can enter the body 102 of the flow valve assembly 100 and flow through the tubes 116a-h, the chamber 112, and the valve 132. The movement of the valve 132 can impart acoustical energy resulting in vibration of the reed valves 124a-l. This vibration of reed valves 124a-l may be transmitted as acoustical energy into a plurality of fluids in the fluid space 109. Transmitting acoustical energy into the fluids in fluid space 109 can alter the pattern, shape, phase, and/or frequency of the fluids to provide for an increase of mixing of the fluids in the fluid space 109.

Figure 4:
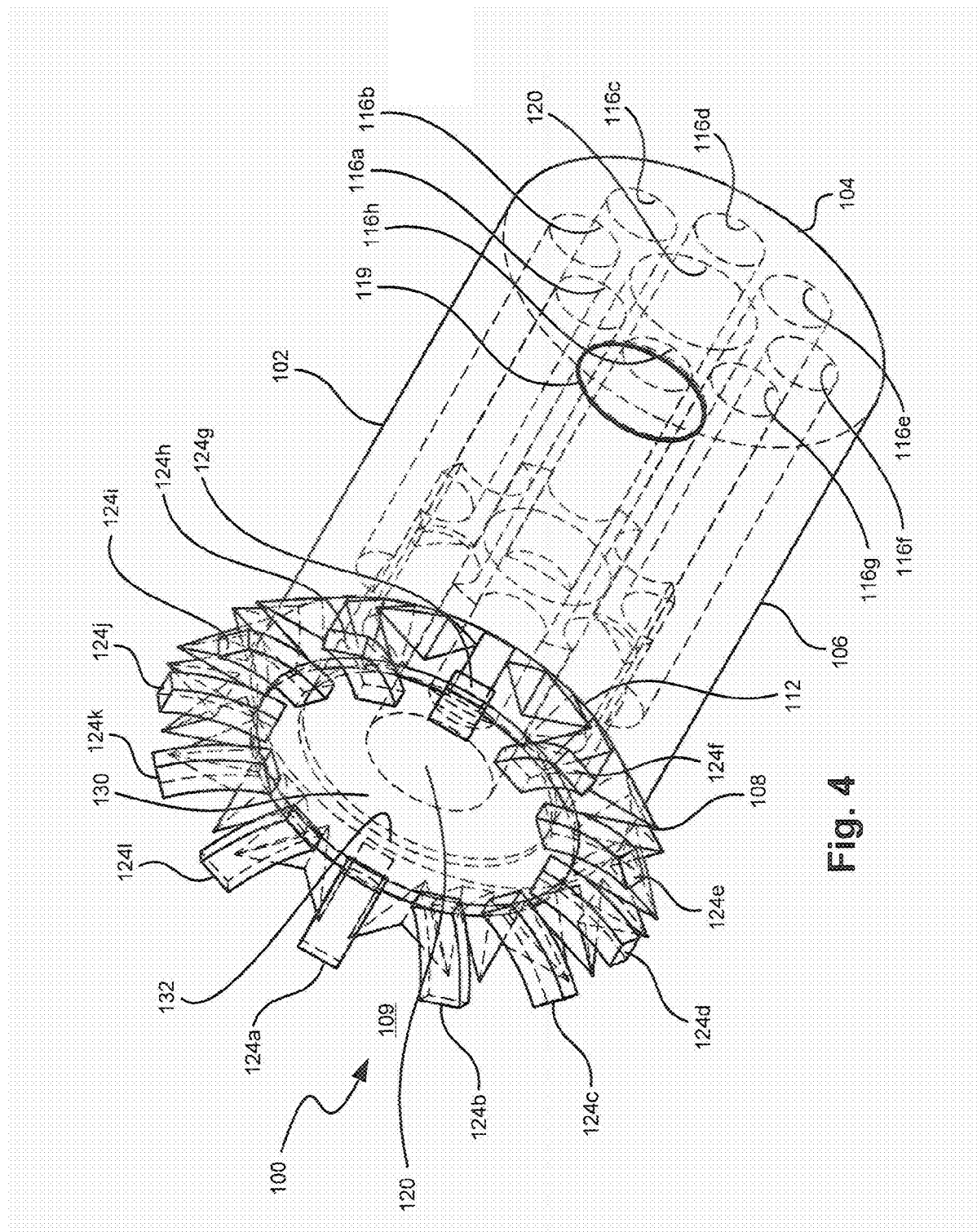
FIG. 4 is an isometric cross-sectional side view of a flow valve configured in accordance with another embodiment of the disclosure.

FIGS. 4 and 5 depict another embodiment of the flow control assembly 100 depicted in FIGS. 1 and 3, respectively. In the illustrated embodiment of FIGS. 4 and 5, the reed valves 124a-l comprise at least two metals wherein a first metal has a first coefficient of thermal expansion and a second metal has a second coefficient of thermal expansion different from the first coefficient of thermal expansion (i.e., a "bimetal"). Configuring the reed valves 124a-l to comprise a bimetal can result in each of the reed valves 124a-l curling or being similarly deformed along their length resulting from the expansion of the constituent metals at different rates with regard to temperature. According to aspects of the embodiment, the extent of the deformation of the individual reed valves 124a-l can be proportional to a change of temperature of the fluid space 109 that surrounds the reed valves 124a-l. A first edge of each of the reed valves 124a-l can be attached to the face 130 of the flow valve 132 while a second edge is unrestrained and can be allowed to curl outward from the valve face 130 in response to an increase in temperature in the fluid space 109. The curling outward of the reed valves 124a-l can result in increased fluid flow through the grooves 125a-l because the area by which the reed valves 124a-l cover the corresponding grooves 125a-l is effectively decreased. Furthermore, the curling outward of the reed valves 124a-l in response to increase in temperature can decrease the effective length of each of the reed valves 124a-l, thereby increasing the vibration frequency of each of the reed valves 124a-l.

The flow valve assembly 100 or 600 (FIGS. 6A and 6B) can further include one or more piezoelectric components 602, and a sensor 133 and/or transmitting component for detecting and relaying properties of the fluid space 109 such as temperatures and pressure. The sensor 133 can be integral to the valve 132, the valve actuator 120, and/or the face portion 108 or a separate component that is carried by any of these portions of the flow valve assembly 100. The sensor 133 can be used to observe the curl of the reed valves 124a-l. The curl or deformation of the reed valves 124a-l can be monitored and compared to a resting state, providing an approximate visual determination of the temperature of the fluid space 109.

In another embodiment, the valve actuator 120 can be formed from fiber optic cables or insulated transducers integrated within a rod or cable, or can include other sensors to detect and communicate data about fluid space 109 to the sensor 133. Although not shown in FIG. 1, in other embodiments, the flow valve assembly can include other acoustical drivers such as piezoelectric components, sensors or monitoring instrumentation located at various positions on the flow valve assembly 100. For example, the body 102 can include optical fibers integrated into the material of the body 102. In addition, the flow valve 132 can be configured to sense or carry sensors 133 to transmit data to one or more controllers associated with the movement of valve actuator 120. This data can be transmitted via wireless, wired, optical, or other transmission mediums to an external controller of the piezoelectric driver and/or a mechanical movement means displacing the valve actuator 120 and flow valve 132. The rate and velocity of mechanical movement means driving the valve actuator 120 and flow valve 132 can be adjusted to achieve desired fluid factors and characteristics in the fluid space 109 based on data from the sensor 133. Illustratively, the temperature of combustion can be adaptively adjusted by the frequency and intensity of acoustical energy produced by one or more piezoelectric drivers to control the rate of combustion and thus the temperature of combustion. This is particularly beneficial in stratified charge injections of one or more fuel streams in which the fuel is surrounded by surplus air that insulates the combustion and reduces heat transfer to combustion chamber wall surfaces such as the piston, cylinder walls, valves and other components of the combustion chamber In some embodiments, for example, the flow valve assembly 100 or 600 can be disposed within and/or attached to a fuel injector and the fluid space 109 can be a combustion chamber. A fuel can be transported into the flow valve assembly 100 through the base portion 104 and carried by the tubes 116a-h through the body 102 into the chamber 112. An actuator of the fuel injector can be connected to the valve actuator 120 and flow valve 132 to inject fuel into the combustion chamber of an engine. As the fuel is propelled into the combustion chamber by the flow valve 132, an acoustical energy is imparted into the fuel.

In another embodiment, the combination of the shape of the flow valve 132 and the pressure drop of a fuel passing through the flow valve 132 into the fluid space 109 instigates an acoustical disturbance that alters a frequency of fuel being dispersed into the fluid space 109, and accordingly controls the spray pattern of the fuel and an associated combustion efficiency improvement. Embodiment 600 of FIG. 6A shows a valve assembly 600 with a suitable primary valve actuator 612 such as can be comprised of a pneumatic, hydraulic, electromagnetic, magnetostrictive and/or a piezoelectric component. In some embodiments, the primary valve actuator 612 may force an outwardly opening valve assembly including components 604 and 605 from a normally closed position against a valve seat within a body 606. Once opened, the valve components 604 and 605 allow a flow of one or more selected fluids 608A, 608B, 608C, etc., past the valve seat into the combustion chamber 610. Illustratively a fluid 608A can contain an ignition initiation or accelerator substance such as dimethylether DME or diethylether DEE to ignite or accelerate the combustion of another fuel 608B such as methane, ethane, propane etc., and to interact with another fluid 608C such as pressurized water vapor, an oxide of carbon, ammonia, or hydrogen. In some instances, the valve assembly 100, 600 includes control provisions for one or more piezoelectric embodiments of the primary valve actuator 612 to superimpose a vibration of valve components 604 and 605 at the same or a different frequency of the primary valve actuator 612.

In certain embodiments, the acoustical frequencies applied to the fuel can be sub-audible frequencies (e.g., less than approximately 20 Hz) or ultrasound frequencies (e.g., above approximately 20,000 Hz). In other embodiments, the frequencies can be audible frequencies ranging from about 20 Hz to about 20,000 Hz. The acoustical energy vibrational frequency can be selected based on several factors including the properties of the injector and combustion chamber, as well as fuel type, pressure, temperature, flow rate, etc. For example, a fuel having a relatively high molecular weight may require a relatively higher acoustical energy vibrational frequency applied to the fuel to more quickly initiate and complete combustion. In another embodiment, applying a high frequency, for example a frequency of approximately 2,450 MHz, induces dipolar molecular motion in low-cost fuels having a water component, such as wet alcohol. Such high frequency molecular motion may be generated by an AC or DC microwave driver and may be utilized in conjunction with one or more additional vibrational drivers, such as piezoelectric components, at other frequencies. The selected acoustical energy vibrational frequency can also be at least partially based on feedback from the combustion chamber properties (e.g., temperature, pressure, amount of fuel, oxygen, or oxides of nitrogen, ignition initiation and completion, etc.) that can be read or detected by the sensors 133 or detectors described above.

Combined with a control unit 620, the sensor 133 may provide data to the control unit 620 via a wired or wireless connection 622 to enable adaptive control of the combustion temperature, crank angle of maximum combustion pressure development and heat transfer to the combustion chamber surfaces for purposes such as improved torque and work production along with fuel economy and tolerance to widely varying fuel properties. For example, the control unit 620 may include an injector module that may include computer-readable instructions that are stored within a tangible memory of the control unit 620. The control unit 620 may include both a memory 620A for storing instructions and a microcontroller or processor 620B for executing instructions of the injection module 620C. The control unit 620 may include a register set or register space which may be entirely on-chip, or alternatively located entirely or partially off-chip and directly coupled to the control unit 620 via dedicated electrical connections and/or via an interconnection bus. The processor 620B may be any suitable processor, processing unit or microprocessor. Although not shown, any system employing various embodiments of the flow valve assembly 100, 600 as herein described may be a multi-processor device and, thus, may include one or more additional processors that are identical or similar to the processor 620B and that are communicatively coupled to an interconnection bus. The processor 620B may also be coupled to a chipset, which includes a memory controller and a peripheral input/output (I/O) controller. As is well known, the chipset typically provides I/O and memory management functions as well as a plurality of general purpose and/or special purpose registers, timers, etc. that are accessible or used by one or more processors coupled to the chipset. The memory controller performs functions that enable the processor controller (or processors if there are multiple processors) to access a system memory and a mass storage memory (not shown).

The processor 620B may be in communication connection with the one or more memories 620A storing instruction modules (e.g., injection module 620C) to implement fuel control and injection strategies such as those described herein, adaptive control strategies, or other functions as herein described. For example, the injection module 620C may be stored in the memory 620A and include tangible computer-executable instructions that are stored in a non-transitory computer-readable storage medium. The instructions of the injection module 620C are executed by the processor 620B or the instructions can be provided from computer program products that are stored in tangible computer-readable storage mediums (e.g. RAM, hard disk, optical/magnetic media, etc.).

In another embodiment, the frequency of vibration of the reed valves 124a-l can be tuned to a resonant frequency of the fluid space 109, which can be, for example, a combustion chamber. The reed valves 124a-l are configured to vibrate at the resonant frequency of the combustion chamber, which is determined by several factors, including the type and density of one or more fluids in the combustion chamber, the temperatures of the combustion chamber, and the geometry of the combustion chamber. The flow valve assembly 100 is configured to displace the flow valve 132 and reed valves 124a-l attached thereto when a piston in a combustion chamber is at the end of a compression stroke. The tuned reed valves 124a-l in this embodiment excited one or more resonant modes thereby causing an increase in pressure on the face of the piston compared to the pressure caused by combustion alone in the combustion chamber.

In a further embodiment, the reed valves 124a-l can be configured to vibrate when the flow valve 130 is in a closed position thereby imparting acoustical energy to a second fluid in fluid space 109 different from the first fluid flowing through the flow valve assembly 100. The acoustical energy transmitted to the second fluid can result in the second fluid being in a preferred condition to be mixed with the first fluid when the flow valve 130 is in an open position. The second fluid, for example, can be an oxidant such as air in a combustion chamber and the first fluid, for example, can be a fuel to be injected into a combustion chamber. In order to maximize the temperature produced by combustion of the air and the fuel in the combustion chamber, it may be preferable to have as much air as possible in the center of the chamber prior to combustion. An increased amount of air in the center, as opposed to near the sidewalls of the combustion chamber, can result in a higher temperature in the combustion chamber when the fuel/air mixture is ignited. This can be due to the fact that a decreased amount of heat may escape the combustion chamber through the sidewalls as compared to combustion when air has a relatively even distribution in the combustion chamber. Accordingly, a combustion chamber is provided in which acoustical energy is transmitted to fuel surrounded by oxidant to reduce heat transfer to the walls of the combustion chamber and accelerate the rate of combustion to elevate the temperature of combustion. This can be adaptively controlled to adjust operating parameters including the combustion temperature, crank angle of maximum combustion pressure development and heat transfer to the combustion chamber surfaces for purposes such as improved torque and work production along with fuel economy and tolerance to widely varying fuel properties. In certain embodiments the acoustical energy is transmitted by a valve that controls the fuel flow into the combustion chamber. In other instances the acoustical energy is transmitted to more than one flow of fuel into the combustion chamber. In certain applications the acoustical energy is transmitted to fuel surrounded by surplus oxidant to reduce heat transfer to the walls of the combustion chamber and to adaptively control the rate of combustion to regulate the temperature of combustion. The acoustical energy can include frequencies generated by one or more piezoelectric driver components.

Any of the actuation-related components disclosed herein (including, but not limited to, actuators, drivers, sensors, valves, and/or flow valve assemblies) can be at least partially made from or coated in any number of suitable materials.

It will be apparent that various changes and modifications can be made without departing from the scope of the disclosure. Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. When the claims use the word "or" in reference to a list of two or more items, that word covers all of the following interpretations of the word: any of the items in the list, all of the items in the list, and any combination of the items in the list.

These and other changes can be made to the disclosure in light of the above detailed description. In general, in the following claims, the terms used should not be construed to limit the disclosure to the specific embodiments disclosed in the specification and the claims, but should be construed to include all systems and methods that operate in accordance with the claims. Accordingly, the invention is not limited by the disclosure, but instead its scope is to be determined broadly by the following claims.

Some examples of the embodiments described herein may include:

A combustion chamber in which acoustical energy is transmitted to fuel surrounded by oxidant to reduce heat transfer to the walls of the combustion chamber and accelerate the rate of combustion to elevate the temperature of combustion.

The above combustion chamber in which the acoustical energy is transmitted by a valve that controls the fuel flow into the combustion chamber.

Further, the above combustion chamber in which the acoustical energy is transmitted to more than one flow of fuel into the combustion chamber.

Other examples of the embodiments described herein may include:

A combustion chamber in which acoustical energy is transmitted to fuel surrounded by surplus oxidant to reduce heat transfer to the walls of the combustion chamber and to adaptively control the rate of combustion to regulate the temperature of combustion.

The above other example of a combustion chamber in which the acoustical energy is generated by at least one of a piezoelectric driver, vibration induced by fuel flow.

Further, the above other combustion chamber in which the acoustical energy is transmitted to more than one flow of fuel into the combustion chamber.

I claim:

1. A flow valve assembly for modifying acoustical energy of a fluid, the flow valve assembly comprising:
   a body including—
      a base portion configured to receive the fluid into the body;
      one or more of tubes disposed therein configured to transport the fluid from the base portion through the body; and
      a bore extending therethrough;
   a valve actuator disposed in the bore of the body wherein the valve actuator is configured to be movable between a first position and a second position;
   a flow valve coupled to the valve actuator, wherein the valve is movable to an open position thereby allowing the fluid to flow therefrom;

a plurality of reed valves adjacent to the flow valve and configured to respond to fluid movement through the flow valve.

2. The flow valve assembly of claim 1 wherein the plurality of reed valves comprises a first metal having a first coefficient of thermal expansion and a second metal having a coefficient thermal of expansion different from the first metal.

3. The flow valve assembly of claim 1 further comprising a sensor configured to register one or more conditions in a fluid space proximate to the flow valve and the reed valves.

4. The flow valve assembly of claim 1 wherein the valve actuator is configured to be acoustically displaced thereby resulting in an oscillation of the flow valve from the open position to a closed position.

5. The flow valve assembly of claim 1 wherein the reed valves vibrate in response to the fluid movement.

6. The flow valve assembly of claim 1 wherein the reed valves are disposed on the flow valve.

7. The flow valve assembly of claim 1 wherein the reed valve is positioned in the fluid flow pathway.

8. The flow valve assembly of claim 1 further including a diaphragm positioned between the flow valve and the reed valves.

9. A method of operating a flow valve assembly to control a flow of a fluid, comprising:
   introducing a first fluid into a body portion of the flow valve assembly, the body portion including a flow valve, the flow valve being movable between an open position and a closed position;
   configuring the flow valve to oscillate from the closed position to the open position to introduce at least a portion of the first fluid into a fluid space adjacent to the flow valve;
   configuring a plurality of reed valves positioned to vibrate in response to energy imparted by flow of fuel and/or oscillations of the flow valve;
   imparting acoustical energy to at least one of the first fluid, the flow valve, the plurality of reed valves, or a second fluid in the fluid space adjacent to the flow valve.

10. The method of claim 9 wherein imparting acoustical energy comprises transferring energy to alter a vibrational frequency of at least one of the first fluid, the flow valve, the plurality of reed valves or the second fluid in the fluid space adjacent to the flow valve.

11. The method of claim 9, further comprising sensing one or more conditions in the fluid space adjacent to the flow valve, and wherein imparting acoustical energy comprises adaptively altering, in response to the sensing, the movement of the first fluid, the flow valve, the plurality of reed valves or the second fluid in the fluid space adjacent to the flow valve.

12. The method of claim 9 wherein imparting acoustical energy comprises propagating pressure waves of acoustical energy through the first fluid and altering a frequency of vibration in the first fluid.

13. The method of claim 9 wherein imparting acoustical energy comprises controlling the frequency, shape, pattern, and/or phase of a plurality of fluids in the fluid space adjacent to the flow valve.

14. The method of claim 9 wherein imparting acoustical energy comprises subjecting the first fluid to a pressure drop as the first fluid passes through the flow valve into the fluid space adjacent to the flow valve.

15. The method of claim 9 wherein imparting acoustical energy comprises inducing a frequency above about 20,000 Hz in at least one of the first fluid, the flow valve, the plurality of reed valves or the second fluid in the fluid space adjacent to the flow valve.

16. The method of claim 9, further comprising sensing a temperature or pressure in the fluid space adjacent to the flow valve and modifying the frequency, shape, pattern, and/or phase of the first fluid in response to the sensed temperature or pressure.

17. The method of claim 9 wherein the plurality of reed valves is configured to elastically deform in response to a change in temperature in the fluid space adjacent to the flow valve, thereby allowing increased flow of the first fluid from the flow valve assembly.

18. The method of claim 9 wherein the plurality of reed valves is configured to vibrate at a first frequency corresponding to a first temperature in the fluid space adjacent to the flow valve and at a higher frequency than the first frequency in response to an increase in temperature in the fluid space adjacent to the flow valve.

19. The method of claim 9 further comprising configuring the plurality of reed valves to vibrate at one or more frequencies that correspond to one or more resonant frequencies of the fluid space adjacent to the flow valve.

20. A method of operating a flow valve assembly to control a flow of a fluid, the method comprising:
   introducing a first fluid into a body portion of the flow valve assembly, the body portion including a valve actuator, a flow valve, and a plurality of reed valves disposed on the flow valve;
   sensing one or more conditions in a fluid space exterior to the flow valve; and
   generating acoustical energy to control movement of at least one of the first fluid, the valve actuator, the flow valve, or a second fluid in the fluid space exterior to the flow valve.

21. The method of claim 20 wherein generating acoustical energy comprises inducing vibrations having a vibrational frequency in the valve actuator and opening and closing the flow valve at a regularity dependent on the vibrational frequency.

22. The method of claim 20 wherein generating acoustical energy comprises modifying a frequency, shape, pattern, and/or phase of at least one of the first fluid or the second fluid.

23. The method of claim 20 wherein generating acoustical energy comprises generating acoustical energy having a first frequency, the method further comprising generating acoustical energy having a second frequency different from the first frequency in response to one or more sensed conditions in the fluid space exterior to the flow valve.

* * * * *